Feb. 19, 1963  V. H. HASSELQUIST  3,077,803
AUTOMATIC ALIGNMENT OF BIAS-CUT STOCK
Filed Aug. 5, 1958  8 Sheets-Sheet 1
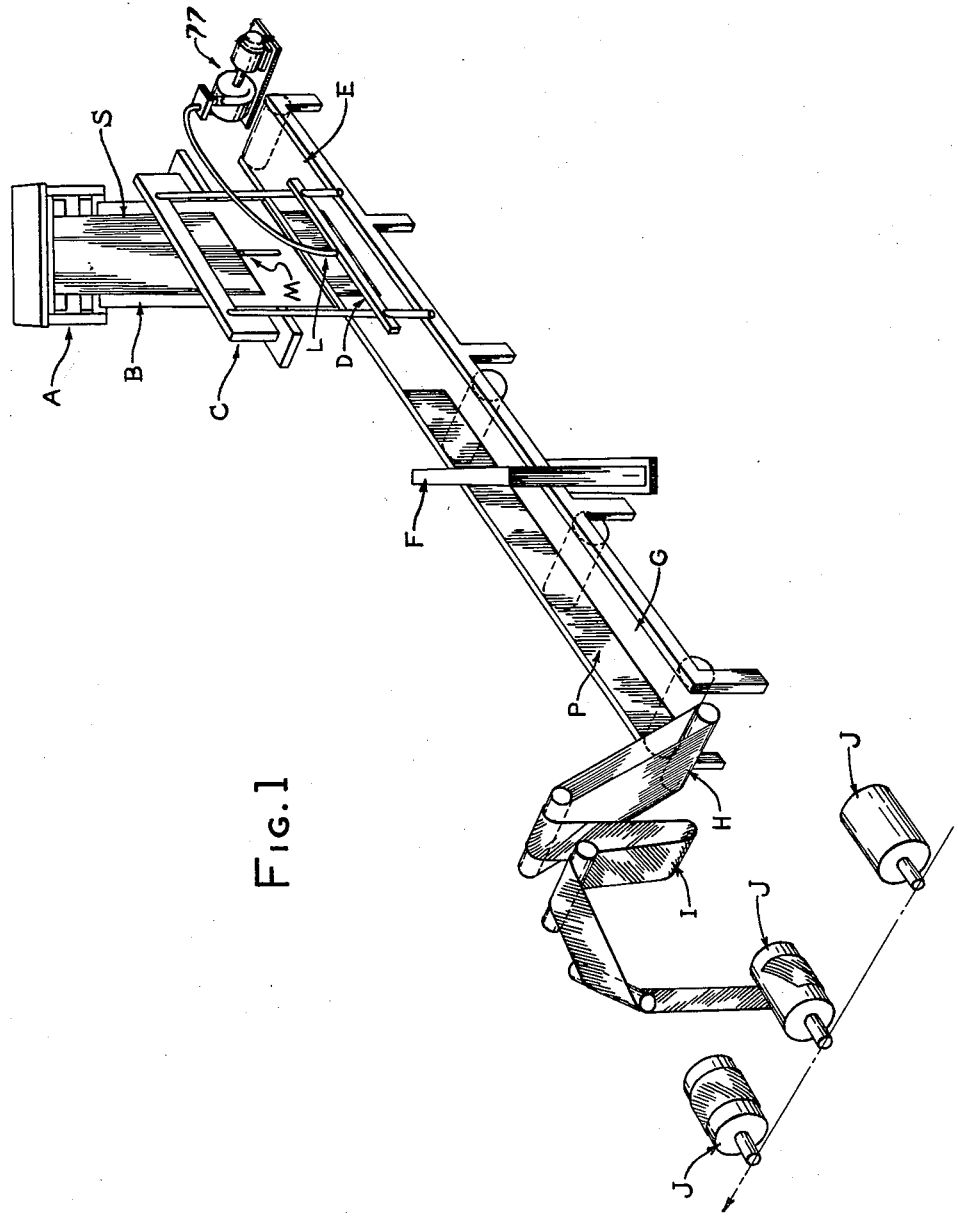
INVENTOR.
VICTOR H. HASSELQUIST
BY C. E. Tripp
ATTY.

Feb. 19, 1963
V. H. HASSELQUIST
3,077,803
AUTOMATIC ALIGNMENT OF BIAS-CUT STOCK
Filed Aug. 5, 1958
8 Sheets-Sheet 2
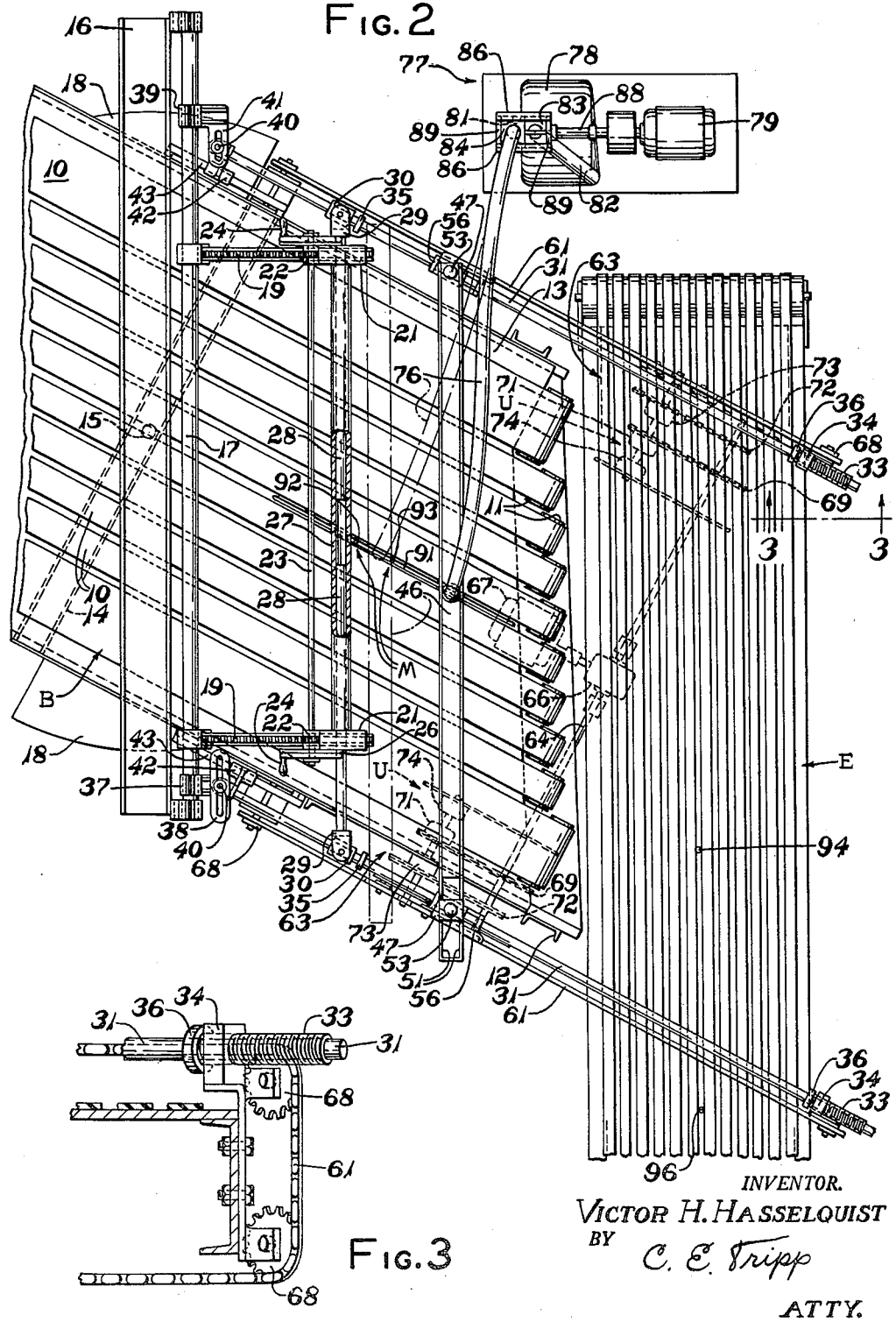
INVENTOR.
VICTOR H. HASSELQUIST
BY C. E. Tripp
ATTY.

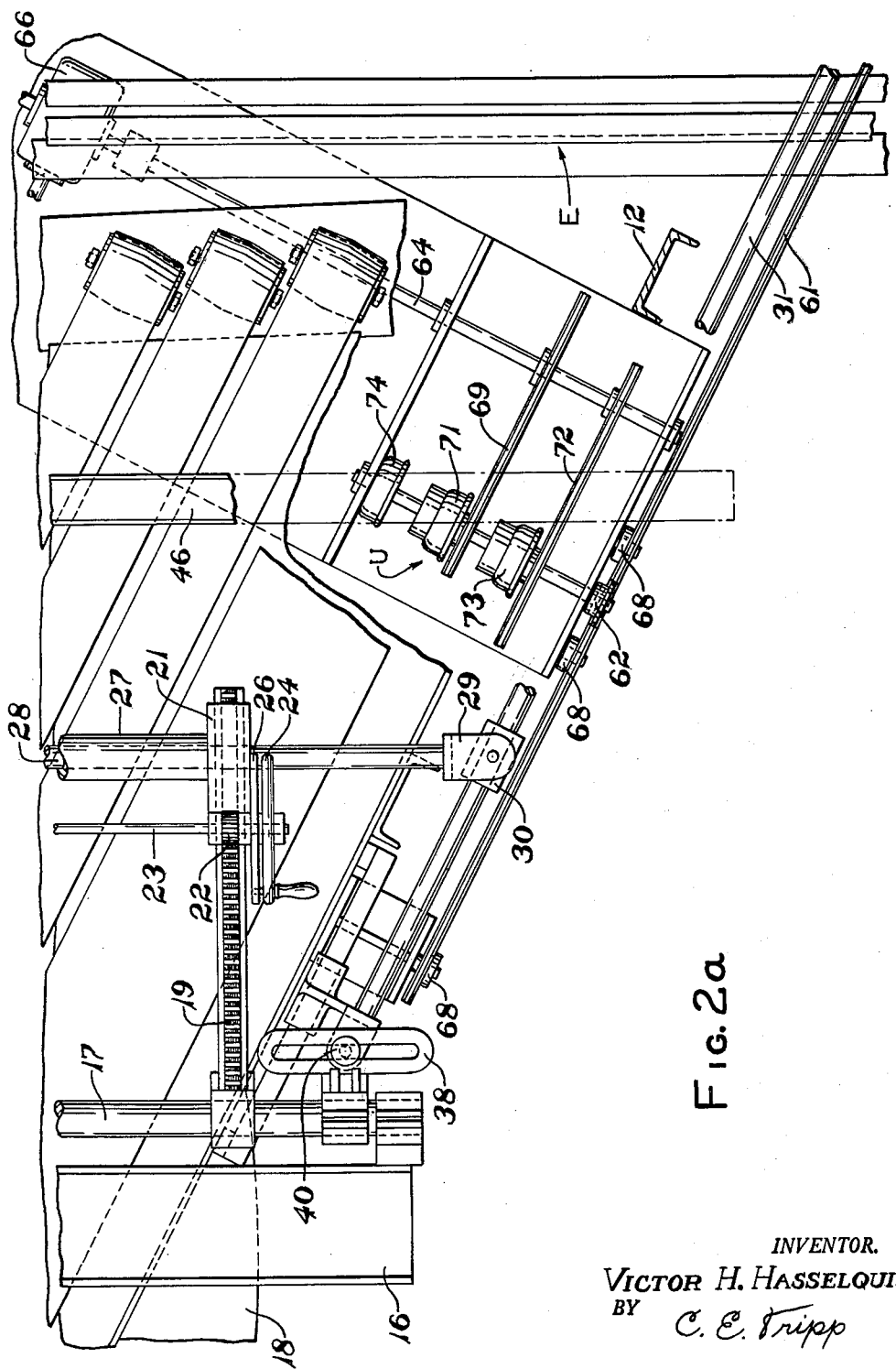

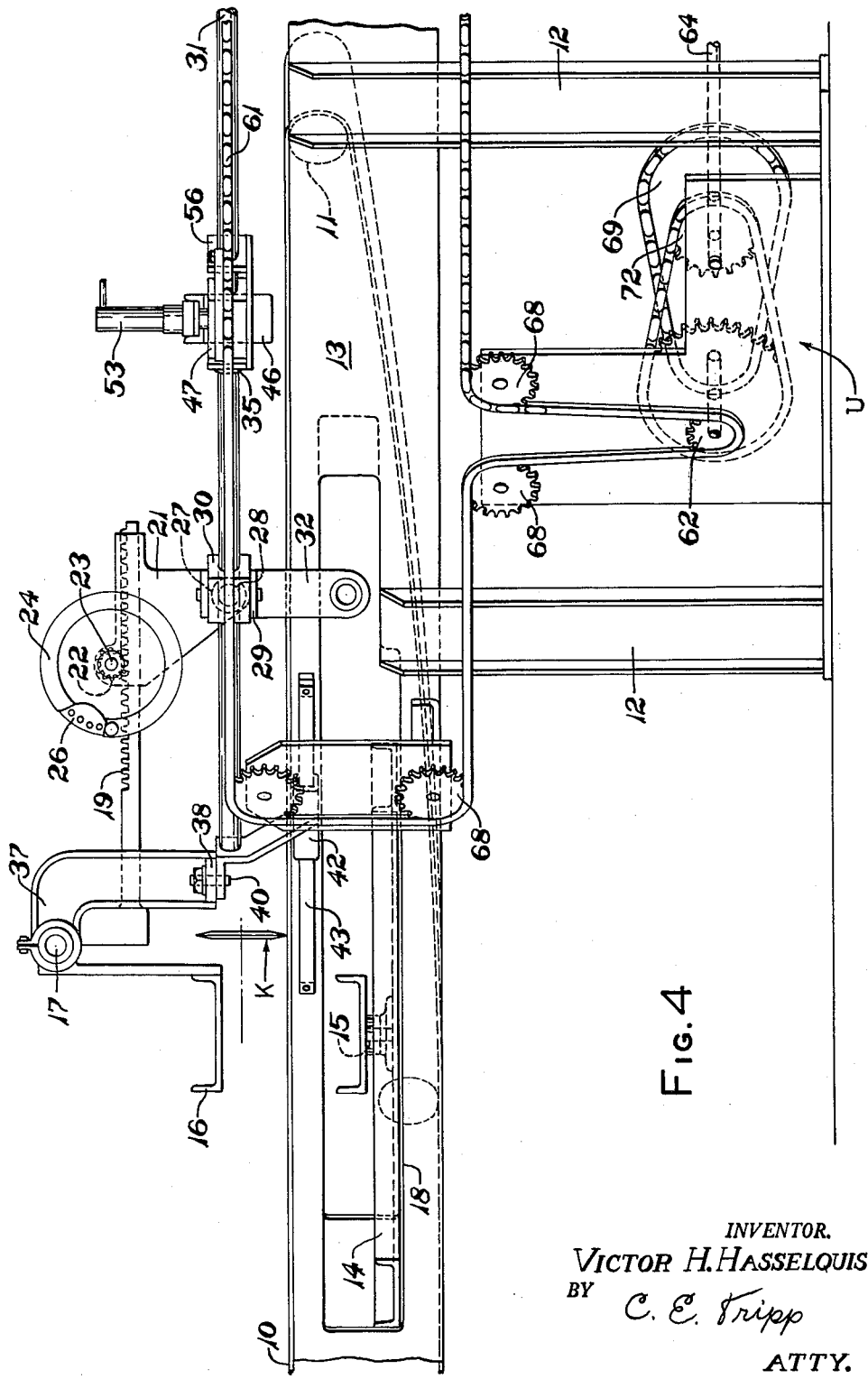

Feb. 19, 1963   V. H. HASSELQUIST   3,077,803
AUTOMATIC ALIGNMENT OF BIAS-CUT STOCK
Filed Aug. 5, 1958   8 Sheets-Sheet 5
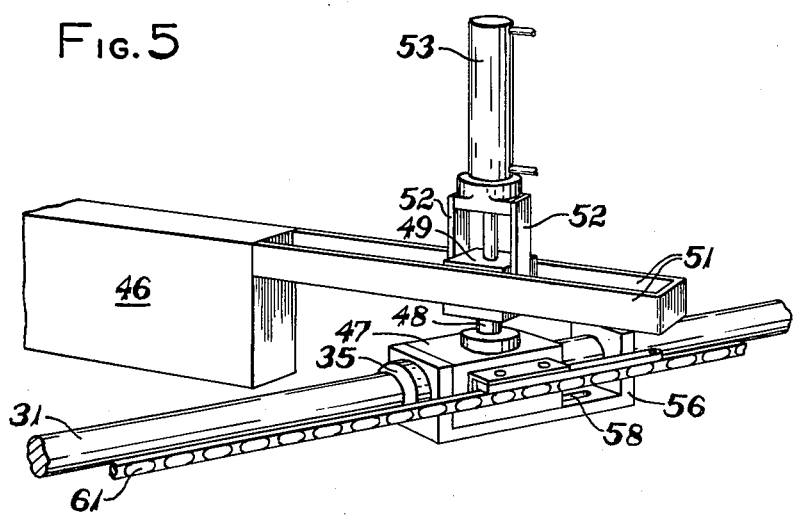
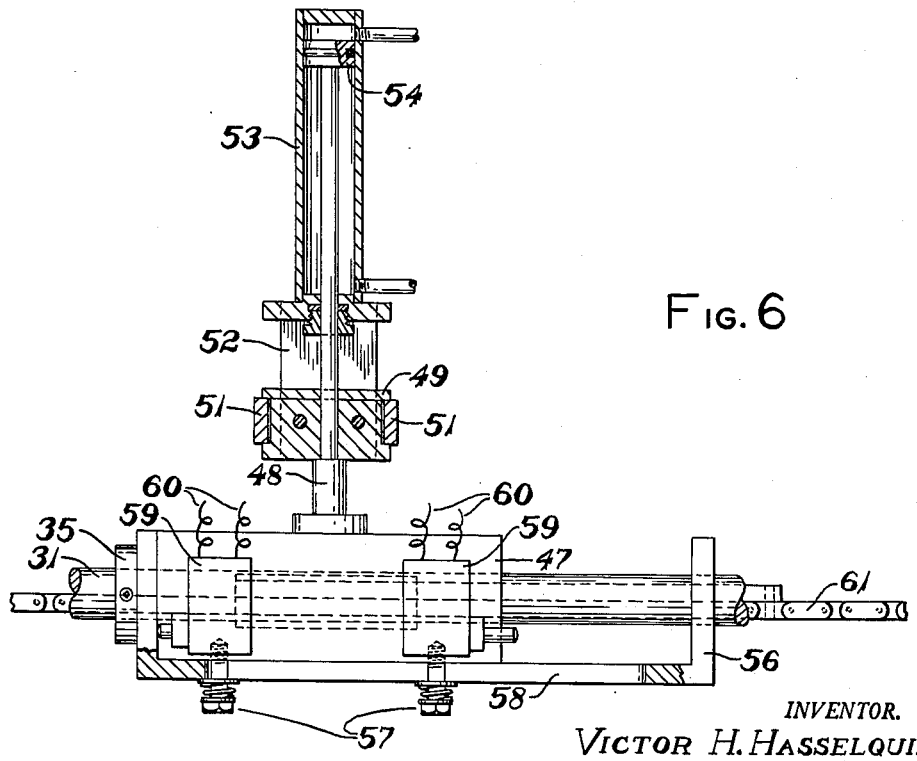
INVENTOR.
VICTOR H. HASSELQUIST
BY
C.E. Tripp
ATTY.

Feb. 19, 1963 V. H. HASSELQUIST 3,077,803
AUTOMATIC ALIGNMENT OF BIAS-CUT STOCK
Filed Aug. 5, 1958 8 Sheets-Sheet 6
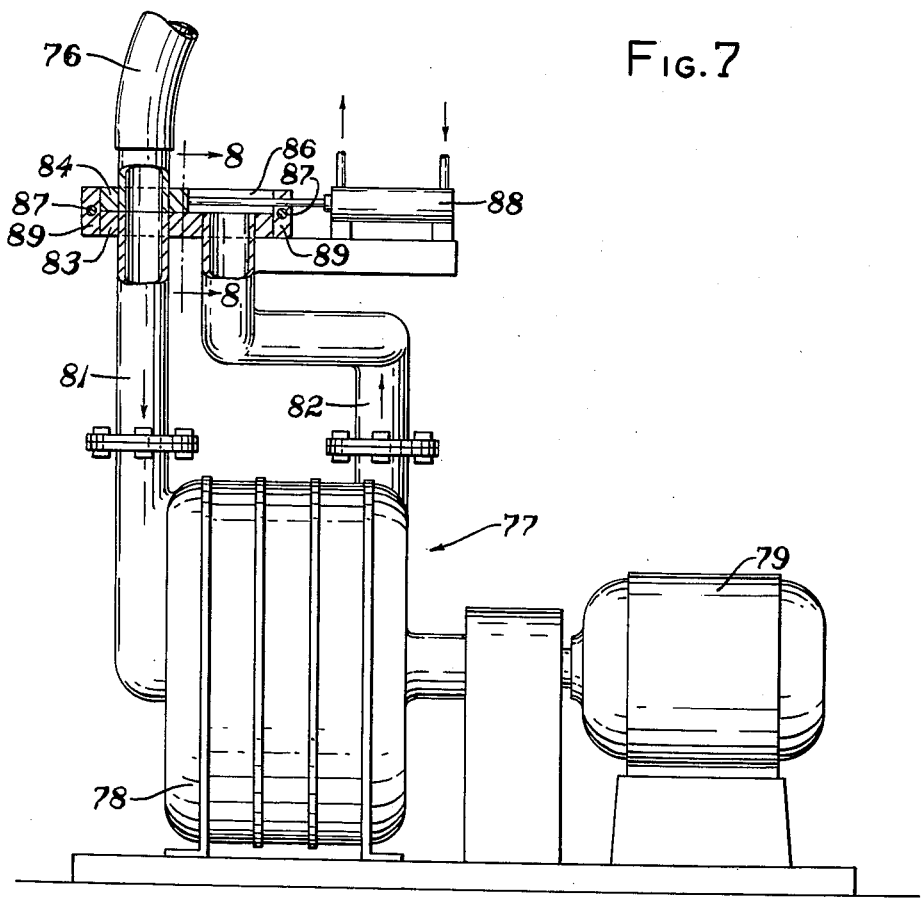
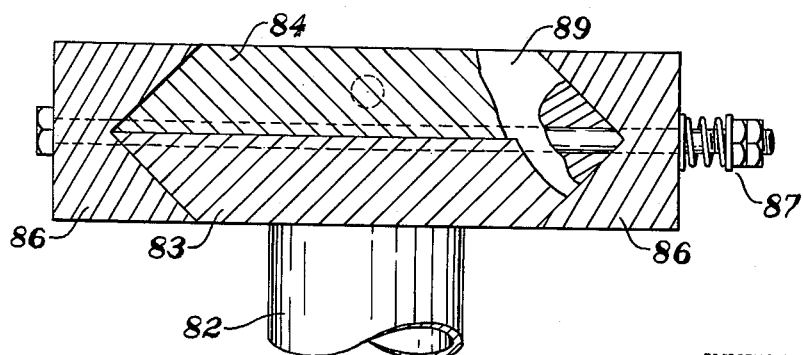
INVENTOR.
VICTOR H. HASSELQUIST
BY C. E. Tripp
ATTY.

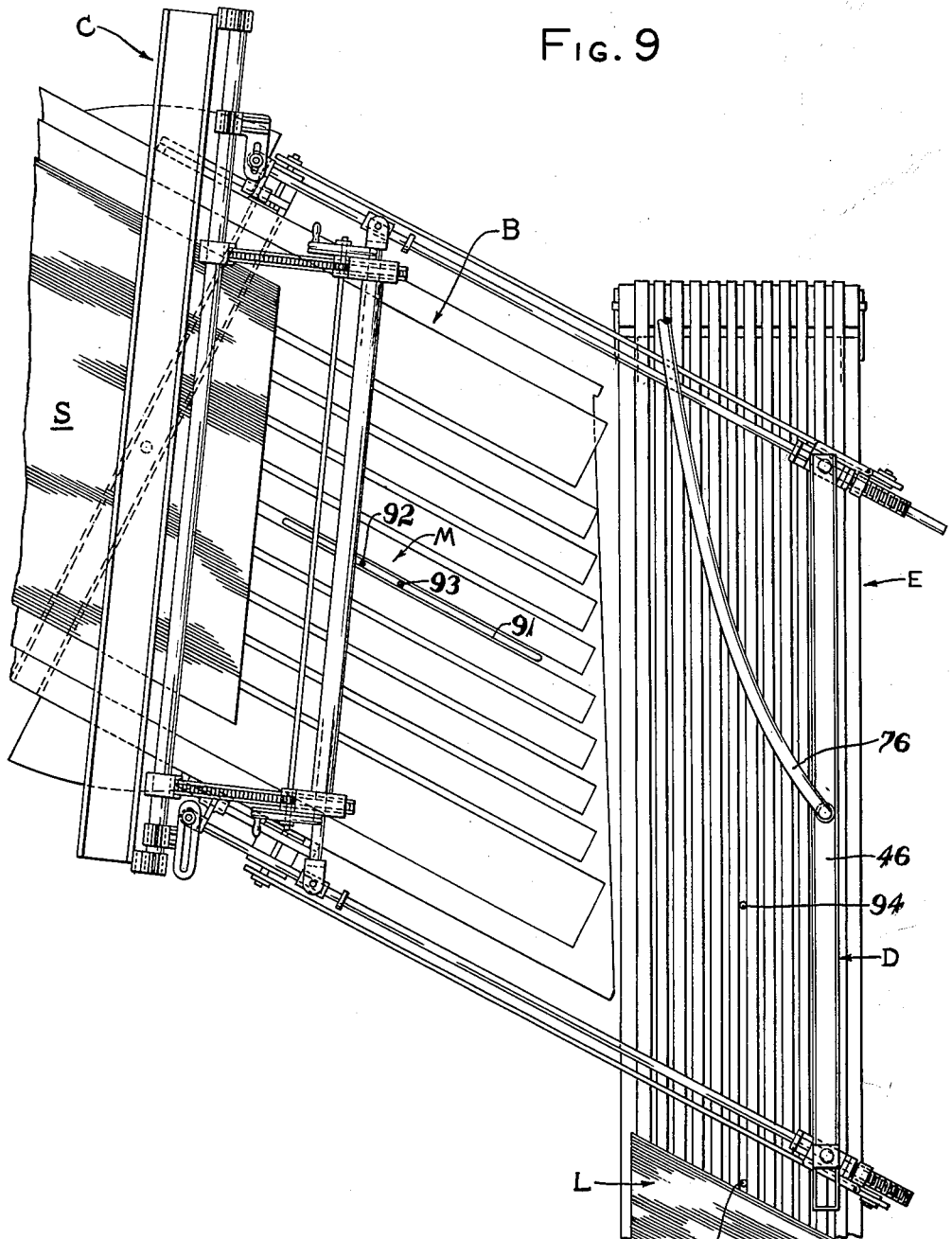

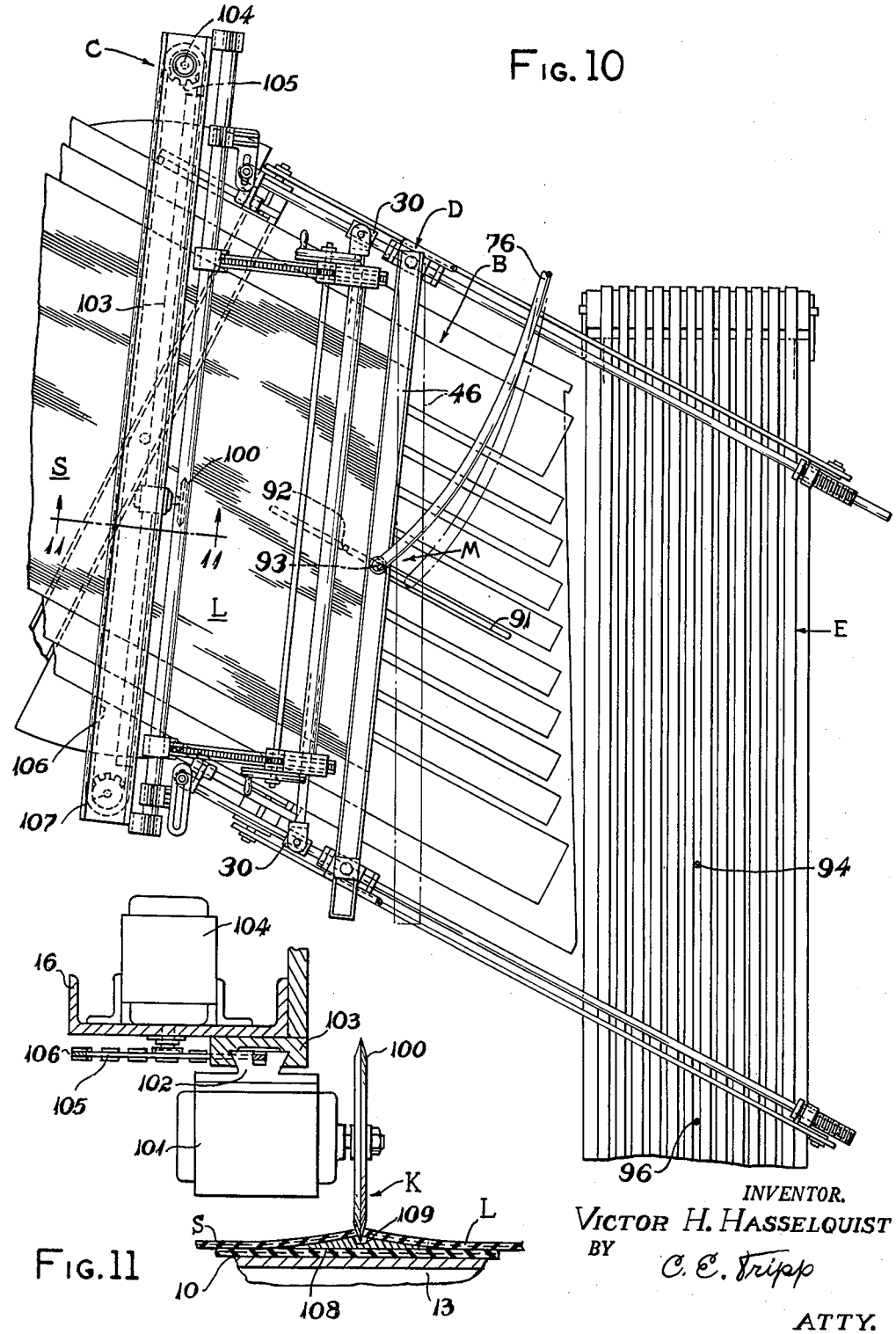

United States Patent Office 3,077,803
Patented Feb. 19, 1963

3,077,803
AUTOMATIC ALIGNMENT OF BIAS-CUT STOCK
Victor H. Hasselquist, Akron, Ohio, assignor to The B. F. Goodrich Company, New York, N.Y., a corporation of New York
Filed Aug. 5, 1958, Ser. No. 753,343
14 Claims. (Cl. 83—81)

This invention relates to a self-aligning transfer device especially useful for transferring bias-cut tire cord fabric from the bias cutter to the conveyor that feeds a butt splicer.

It is a feature of this invention that the bias cutter conveyor and butt splicer feed conveyors may be installed at a fixed angle to one another but the bias cutter itself may be set at various angles relative to its conveyor to supply lengths of severed stock cut at various desired bias angles. The mechanism that automatically transfers the severed length of stock from the bias cutter to the feed conveyor includes, in the preferred embodiment of the invention, an elongated vacuum box mounted on guides that extend along each side of the bias cutter conveyor and across the feed conveyor. One end of the vacuum box is pivotally mounted on a small carriage or traveler that slides on one guide and the other end of the vacuum box is both pivotally and slidably mounted on a similar traveler or carriage that slides on the other guide. Stop means are provided on each guide in alignment with the setting of the bias cutter, and sensing and control mechanisms are provided that cause drive mechanism to bring the vacuum box to rest at the bias cutter in parallel relation thereto. Stop means are also provided at the far side of the feed conveyor that arrest motion of the vacuum box drive when the box is parallel to the path of travel of the feed conveyor. In case the bias cutter path is not parallel to the path of the feed conveyor, the aforesaid mounting of the vacuum box causes the end of the box that first engages a stop at either terminal position of the box to remain at such position while the other end continues to be driven until that end engages its stop means whereupon the drive of that end is likewise stopped. This provides automatic compensation for any divergence of the bias cutter and feed conveyor paths that might occur.

In the preferred embodiment of the invention, the stop means at the feed conveyor have provisions for manual adjustment to bring the stop means into parallelism with the feed conveyor, whereas the stops at the bias cutter are linked to the cutter arm so that the stops and the path of cutter travel are automatically maintained in parallel relation. Suitable cycle control solenoid valves electric motors, clutches, brakes and fluid motors are provided to synchronize operation of the various units to provide for automatic operation.

The manner by which one skilled in the art may practice the invention will be apparent from the following detailed description of a preferred embodiment thereof.

In the drawings:

FIG. 1 is a perspective view of the transfer apparatus of the invention with the vacuum box disposed at the bias cutter. In this and in the other views the bias cutter itself is shown diagrammatically because details of the bias cutter form no part of the invention;

FIG. 2 is a plan view at the bias cutter;

FIG. 2a is an enlarged plan view of one side of the bias cutter;

FIG. 3 is a view of the chain drive at the conveyor taken on line 3—3 of FIG. 2;

FIG. 4 is a side view of the apparatus;

FIG. 5 is a perspective view showing one end of the vacuum box;

FIG. 6 is a detailed section showing the vacuum box mounting;

FIG. 7 shows the vacuum air supply unit;

FIG. 8 is a section taken on 8—8 of FIG. 7;

FIGS. 9 and 10 are diagrams showing two phases of the operation of the device; and FIG. 11 is a detailed view taken on the line 11—11 of FIG. 10.

Referring to FIG. 1, the system embodying the invention includes a fabric strip let-off festooner assembly A which supplies a strip of rubberized fabric cords S to a bias cutter conveyor B. The bias cutter C operates to cut lengths of bias cut stock L from the main strip. The vacuum box D forming a part of this invention transfers the bias-cut strips from the bias cutter conveyor B to a butt splicer feed conveyor E. This conveyor is actuated by suitable controls to feed the lengths of stock L to a butt splicer F which combines the lengths into a single strip P of bias-cut stock. This length of stock is carried away from the bias cutter by a conveyor G in a festooner conveyor H, the arrangement being such as to provide a loop or festoon I of the stock so that it can be intermittently fed and applied to the tire building drums J.

Referring to FIGS. 2, 2a, 4, 10 and 11 the bias cutter conveyor B is made up of a series of belts 10 that pass over end pulleys 11 disposed at the feed conveyor E. The conveyor is supported on a frame including legs 12 and a base 13 which supports the bias cutter by means of a carriage 14. Details of the carriage are not shown and are not necessary to an understanding of the invention. The mounting is such that the bias cutter pivots about the axis 15 at the center of the conveyor B and can be clamped at the desired bias angle. These devices are well-known in the tire building art.

The carriage 14 of the bias cutter includes a cross support channel 16 above the belts 10 which mounts a knife mechanism K having a rotatable knife blade 100 (see FIGS. 10, 11). Knife mechanism K is adapted to reciprocate relative to channel 16 as the blade 100 is rotated to cut off fabric pieces L. The knife blade is indicated diagrammatically at K in FIG. 4 to simplify this view. The mechanical details of the entire knife mechanism are shown in FIGS. 10 and 11.

Referring to FIGS. 10 and 11, knife mechanism K includes a knife blade 100 mounted for high speed rotation on a motor 101. The latter is attached to a dovetail slide 102 fitting in a corresponding shaped dove-tail channel 103 fastened to the bottom of channel 16. To cut a fabric piece L from the fabric strip S, motor 101 rotates the knife 100 at high speed, and simultaneously, the motor 101 and knife 100 are moved translationally along channel 16 across the fabric strip S from one side of this strip to the other. Dove-tail slide 102 attached to motor 101 slides in guide channel 102 as the motor 101 is so moved. Fabric piece L in FIG. 11 is cut off as the knife 100 and motor 101 traverse the strip S in one direction. Then strip S is fed forwardly to position a new fabric piece L and the new piece L is cut off by the reverse translational movement of knife 100 and motor 101 along channel 16. For this purpose, motor 101 will be equipped with controls (not shown) for reversing the rotational direction of the knife blade as each cut is begun.

Motor 101 and the knife blade 100 are propelled back and forth in guide channel 102 lengthwise of support channel 16 by a motor 104 mounted rigidly on one end of channel 16. This motor drives a sprocket 105 (see upper left corner, FIG. 10) and an endless chain 106 which is looped around another sprocket 107 (see lower left corner, FIG. 10) at the opposite end of channel 16. One portion of chain 106 is rigidly fastened to dovetailed slide 102 of motor 101. Accordingly when motor 101 is started, the chain 106 is driven about its sprockets 105 and 107 and therefore pulls slide 102 and motor 101 along channel guide 103. Motor 104 will be equipped with suitable controls (not shown) to stop this motor when the cutting stroke of the knife is completed at each side of the fabric strip S and to reverse the driving direction of this motor so that it will operate to reverse the movement of motor 101 and knife blade 100 for the next successive cutting operation.

To prevent the knife blade 100 from severing the belts 10 of the bias conveyor as it traverses the fabric strip S, a cutting plate 108 (see FIG. 11) extends transversely across the top of belts 10 and plate 108 has a groove 109 into which the knife blade projects. The cutting plate 108 is supported at its ends by the carriage 14 (details not shown) so that when the angular position of the carriage is shifted, the plate 108 remains aligned with the track of knife blade 100. The lengthwise margins of the plate 108 are thin and the plate tapers in thickness from these margins to the groove 109 so that the strip S can feed over the top of the plate as the strip is advanced progressively by the belts 10.

Bias cutters of the class described embodying cutters similar in principle to knife mechanism K are well known in the art and various forms of cutter mechanisms other than mechanism K may be used in practicing this invention. Knife mechanism K is basically similar in its mechanical principles to the cutter mechanism shown in U.S. 2,727,571, for example. Also it is similar in principle to the rotary cutters shown and described in Heston U.S. 1,874,750, and Alexander et al. U.S. 1,888,754 to which reference may be made for further details of the bias cutter mechanism.

The transfer devices of this invention are supported from a horizontal cross bar 17 (see FIGS. 2 and 4) at the top front side of the bias cutter. A plate 18 appearing in FIG. 2 is an arcuate indexing plate for the bias cutter carriage 14.

Means are provided for adjusting the width of the plies L cut from the main strip, which width is measured perpendicular to the cut edges of the stock. A width adjusting rack 19 extends from the bias cutter and slidably mounted thereon is a pair of carriages 21 that have pinions 22 engaging the rack and connected by a cross shaft 23. A hand crank 24 turns the pinions and thus moves the carriages. An index plate 26 is provided to maintain the crank at its desired position. The carriages are also supported on a cross tube 27 in which slides a pair of rods 28. The outer ends of the rods have clevises 29 that are pivoted on sliding stop blocks 30 that slide on a pair of guide rails 31. The stop blocks have depending arms 32 that mount cross members that extend under the upper reach of belts 10 and carry adjustable sensing means M for controlling the feed of conveyor B. This mechanism, not shown in detail, forms the subject matter of my copending application S.N. 753,274 filed Aug. 5, 1958, now U.S. Patent No. 2,979,978, granted April 18, 1961.

The guide rails 31 are slidably mounted at the far side of the feed conveyor E in bushings 33 mounted on suitable supports 34. Fixed stops 35 are mounted at the bias cutter end of the vacuum box travel. Each bushing contains a threaded stop collar 36 that limits motion of the vacuum box D at the conveyor end of its travel. As best seen in FIG. 4, to support the other end of the guide rails, the bias cutter cross rod 17 has a bracket 37 that has a depending arm mounting a slotted plate 38, the slot showing in FIGS. 2 and 2a. The other end has a similar bracket 39 and a depending arm (not seen) mounting a slotted plate 41. The slotted plates each engage pins 40 on horizontal flanges forming part of a carriage 42, which slides on bars 43. These bars are attached to the frame 10. The purpose of this slide and carriage assembly is to insure that longitudinal guide rails 31 do not interfere with the travel of the bias cutting knife at various adjusted bias angles.

As best seen in FIGS. 5 and 6, the vacuum box D has a shroud or shell 46. Means are provided to pivotally mount one end of the shell on one guide rail 31 and to pivotally and slidably mount the other end on the other guide rail. This means includes a pair of blocks 47 slidably mounted on the guide rails from which extend vertical posts 48. Pivot support blocks 49 are mounted on the posts, these serving to support the vacuum shell 46. At the end where the vacuum box is both pivotally and slidably mounted, a pair of straps 51 slide in grooves in the block 49. In order to raise and lower the vacuum shell for picking up and transporting the lengths of stock L, the ends of the shell are mounted on piston and cylinder assemblies. As seen in FIG. 6, each assembly includes support plates 52 extending upwardly from the block 49 and mounting the cylinder 53. The piston 54 for the cylinder has its piston rod fixed to the post 48. This arrangement is such that when pressure is applied above the piston 54, the entire cylinder assembly including its support 52 and blocks 49 are lifted, thereby lifting the vacuum box. Of course, the reverse action occurs when the air supply shifts to the lower end of the cylinder.

As best seen in FIG. 6, in order to provide for starting and stopping travel of the vacuum box as well as to provide for fast and slow speed operation, each end of the vacuum box assembly has a shoe 56 which is friction mounted on block 47 by means of spring loaded bolts 57 extending through a slot 58 in the shoe. Each end of block 47 has a pair of limit switches 59 which when connected with suitable controls serves to start the travel of the vacuum box, slow it down near the end of its travel, and stop it at its final position. Leads 60 shown in FIG. 6 go to the master control unit, which cycles the apparatus to carry out the steps explained later. Details of the control unit are not shown because this unit merely embodies the necessary relays and interlocks which are assembled to produce the cycle that will be described, such units being built up by the use of ordinary skill in the art from standard parts in order to carry out the desired cycle of the operation.

In order to move the vacuum box in its path of travel, the block at each end of the vacuum box is fastened to a drive chain 61 that connects to sliding blocks 47. (See FIG. 5.) A pair of magnetically controlled two speed units U, shown in dotted lines in FIGS. 2 and 4 (see also FIG. 2a) is employed. These units include a main drive shaft that can be clutched or de-clutched, and high and low speed drive sprockets that can be clutched or de-clutched. Each chain 61 is driven individually by a sprocket 62 operated from its speed change unit U, each unit U in turn receiving its drive from a cross power shaft 64, a speed reducer 66 and a motor 67, these being shown in FIG. 2.

Each drive unit U has an independent high-speed drive sprocket 69 and a high-speed magnetically actuated clutch 71 (FIGS. 2 and 2a) as well as a low-speed drive 72 and a low-speed magnetically actuated clutch 73. There is also magnetically actuated brake 74 to hold the vacuum box in its final position. Such clutches and brake are well-known in the machine design art and may be of conventional commercial design. They are engaged or disengaged in response to electrical signals from the main control unit relays sent to the clutch or brake units.

In the vacuum system, a hose 76 is connected to the center of the vacuum box in order to pick up the stock and the hose may also be supplied with air under pressure to release the stock. To this end, as seen in FIGS. 2, 7 and 8, an exhauster unit 77 is mounted to one side of the apparatus and includes an exhauster 78 and a drive motor 79. The inlet (suction) line 81 of the exhauster 78 provides the vacuum for the vacuum box and the exhaust end 82 is connected so that air under pressure may be supplied to the vacuum box for stripping the stock positively at the end of a stroke. Both inlet 81 and outlet 82 are connected by suitable connection to a lower fixed plate 83 (FIG. 8) which forms part of a slide valve. An upper, movable valve plate 84 slides across fixed plate 83 and mounts the hose 76 leading to the vacuum box (FIG. 7). This plate 84 is carried in a pair of guides 86 (FIG. 8) that have V-shaped inner surfaces and the guides are spring loaded to give a friction fit by means of spring and bolt assemblies 87. The valve plate 84 is shifted from position shown in FIG. 7, where it is connected to the inlet of the exhauster and applies vacuum to the vacuum box, to its other position wherein it connects the hose to the outlet 82 and supplies air under pressure to the vacuum box. This motion is provided by a fluid motor piston assembly 88 (FIG. 7) which is controlled by suitable solenoid actuated valves forming part of the master control unit. The limits of motion of the valve plate 84 are defined at each end by a pair of end plates 89 connected to guides 86 through which the bolts 87 pass, these plates being slightly shorter than one half the width of the valve plate 84 so that the guide plates 86 press against the base plate 83 and the valve plate 84.

In order to control the feed of the bias cutter conveyor B and hence the width of the lengths of stock L provided by the cutting operation, the upper table of the conveyor is slotted as at 91 and sensing fingers 92 and 93 extend upwardly through the slots for engagement by the stock. Finger 92 places the conveyor drive in slow speed operation and finger 93 stops and brakes the drive thereby determining the width of the bias cut length of stock. These fingers are mounted on the mechanism M beneath the table and supported by arms 32 which are automatically adjusted to give the desired length of feed as determined by the setting of the hand crank 24 which adjustment is not changed by changing the angle of the bias cutter. The mechanism that accomplishes this forms a part of the aforesaid copending application. For the purposes of this invention it need only be understood that means 92 and 93 are provided for controlling the feed of the bias cutter conveyor, which means could, insofar as this invention is concerned, be adjusted by hand.

Means are provided at the feed conveyor E to insure that the length of bias cut stock L will not be transferred to the feed conveyor until the previous length has been advanced to the butt splicer, clear of the receiving area of the feed conveyor. This involves a pair of sensing means 94 and 96 which may be, for example, a pair of photoelectric cell controls. When a length of stock L is disposed at the feed conveyor by the vacuum box, sensing means 94 will be covered and this will prevent further operation of the vacuum box by suitable circuitry so that two lengths of stock cannot be superimposed. When the bias cutter controls call for a new length of stock L, the feed conveyor E is energized and the sensing means 94 and 96 are uncovered. Position of sensing means 96 assures that the strip will be entirely out of the receiving area and the circuitry is such that both sensing means 94 and 96 must be uncovered before the vacuum box can be actuated to transfer another cut length of stock.

*Operation*

Several steps in the operation of the device are illustrated in FIGS. 9 and 10 although the complete cycle to be described is not illustrated step by step.

Referring to FIG. 9 the vacuum box D is shown disposed at the feed conveyor E and it will be in its raised position with the valve 84 shifted to "air." The previously deposited length of stock has been transported toward the butt splicer by the feed conveyor E and may be in the process of being butt spliced to form the elongated strip P. The sensing means 94 and 96 are uncovered indicating that a cycle can be initiated. The bias cutter conveyor B is in the process of feeding a length of stock S forward.

In FIG. 10, the feed of the conveyor B has been stopped by the sensing means 93 which signals the bias-cutting knife to travel across the cutting bar to sever the stock. Completion of this cut in turn signals the vacuum box drive control to move toward the bias cutter at the high speed and this motion continues uniformly at each end during the stroke, unless the bias angle is such that the bias cutter is not exactly aligned with the feed conveyor. The latter case is shown in FIG. 10 in dot-dash lines wherein the far end of the vacuum strikes its stop block 30 before the near end strikes the corresponding stop. This causes the drive unit for the far end to first slow down and then stop while the drive unit for near the end continues until, as shown in solid lines, the vacuum box is brought into alignment with the bias cutter. As soon as this alignment is obtained by the drive control unit the lift cylinders 88 are given a signal to shift the vacuum valve 84 to supply vacuum to the vacuum box and the lift cylinders 53 lower the vacuum box to pick up the length of stock L. Cylinders 53 then raise the vacuum box which operation signals the drive units to advance the vacuum box at high speed toward the feed conveyor. The control shoes 56 engage sequentially their respective stops 36 at the feed conveyor to first put one end to low-speed drive and finally to de-clutch and brake that drive, and to next put the other end through the same cycle assuming, of course, that the bias cutter and feed conveyor are not in alignment. When the vacuum box has come to rest at the feed conveyor, a signal is given to the air valve cylinder 88 to shift the valve so as to connect the hose 76 on the vacuum box to the outlet line 82 of the exhauster which blows the stock free of the vacuum box, the vacuum box remaining in its raised position. Sensing means 94 is now covered and under these conditions if the butt splicer calls for a new length of stock, the feed conveyor E can be energized to advance the bias-cut length of stock L to the bias cutter. As soon as sensing means 94 and 96 are again uncovered, the apparatus is cleared for a new cycle and the bias cutter conveyor B can begin feeding a new length of stock under the bias-cutting knife.

With this apparatus, the plies are not distorted or stretched as tends to happen when they are handled manually and they are also deposited in exact alignment on the butt splicer conveyor so that the butt splices have continuous edges. The angle of the bias cutter can be changed and this alignment will automatically be maintained and the width of the bias-cut length of stock L will not be changed when the bias angle is changed. Thus, the apparatus of this invention lends itself to an installation wherein the entire system is automatic such as the system illustrated in FIG. 1.

The embodiments of the invention in which an exclusive property or privilege is claimed are defined as follows:

1. Apparatus for cutting and transporting bias-cut lengths of ply stock to a butt splicer comprising a bias-cut conveyor for intermittently transporting a wide strip of ply material, bias cutting knife apparatus extending across said conveyor for cutting lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, pick-up means extending transversely of said bias-cut conveyor for picking up the leading edge of a bias-cut length of stock, guide means extending along said bias-cut conveyor and across said feed conveyor and on which said pick-up means is supported, means for reciprocating said pick-up means on said guide means between a first position for picking up the leading edge of a bias-cut length of stock and a second position at the farther side of said feed conveyor, and means for providing for differential translational movement of one end portion of said pick-up means relative to the other end portion thereof between the terminal positions of the respective end portions at each of said positions, aligning said pick-up means with the bias cutting knife at said first position and with the path of travel of said feed conveyor at said second position.

2. Apparatus for cutting and transporting bias-cut lengths of ply stock to a butt splicer comprising a bias-cut conveyor for intermittently transporting a wide strip of ply material, bias cutting knife apparatus extending across said conveyor for cutting said lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, pick-up means extending transversely of said bias-cut conveyor for picking up the leading edge of a bias-cut length of stock, guides extending along each side of said bias-cut conveyor and across said feed conveyor, a block slideable on each of said guides, means pivotally mounting said pick-up means on one of said blocks, means pivotally and slideably mounting said pick-up means on the other block, means for reciprocating said pick-up means on said guide means between a first position for picking up the leading edge of a bias-cut length of stock and a second position at the far side of said feed conveyor, and stop means for said blocks at each of said positions, said stop means aligning said pick-up means with the bias cutting knife at said first position and with the path of travel of said feed conveyor at said second position.

3. Apparatus for cutting and transporting bias-cut lengths of ply stock to a butt splicer comprising a bias-cut conveyor for intermittently transporting a wide strip of ply material, bias cutting knife apparatus extending across said conveyor for cutting said lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, an elongated vacuum box extending transversely of said bias-cut conveyor for picking up the leading edge of a bias-cut length of stock, guide means extending along each side of said bias-cut conveyor and across said feed conveyor and on which said vacuum box is supported, means for moving said vacuum box on said guide means back and forth between a first position for picking up the leading edge of a bias-cut length of stock and a second position at the far side of said feed conveyor, and means providing for differential translational movement of one end portion of said vacuum box relative to the other end portion thereof between the terminal positions of the respective end portions at each of said positions for aligning said vacuum box with the bias cutting knife at said first position and with the path of travel of said feed conveyor at said second position.

4. Apparatus for cutting and transporting bias-cut lengths of ply stock to a butt splicer comprising a bias-cut conveyor for intermittently transporting a wide strip of ply material, bias cutting knife apparatus extending across said conveyor for cutting lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, pick-up means extending transversely of said bias-cut conveyor for picking up the leading edge of a bias-cut length of stock, guide means extending along said bias-cut conveyor and across said feed conveyor and on which said pick-up means is supported, means for reciprocating said pick-up means on said guide means between a first position for picking up the leading edge of a bias-cut length of stock and a second position at the farther side of said feed conveyor, a cross bar slidably mounted on said guide means and adjustably connected to said bias cutting apparatus to maintain said cross bar parallel to said apparatus, stops on said cross bar for aligning said pick-up means with the bias cutting knife at said first position and other stops for aligning said pick-up means with the path of travel of said feed conveyor at said second position, and means connecting said pick-up means to said guide means providing for differential translational movement of one end portion of said pick-up means relative to the other end portion thereof between the stops engaged by the respective end portions at each of said positions.

5. Apparatus for cutting and transporting bias-cut lengths of ply stock to a butt splicer comprising a bias-cut conveyor for intermittently transporting a wide strip of ply material, bias cutting knife apparatus extending across said conveyor for cutting said lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, an elongated vacuum box extending transversely of said bias-cut conveyor for picking up the leading edge of a bias-cut length of stock, guide means for said vacuum box extending along each side of said bias-cut conveyor and across said feed conveyor, a block slidable on each guide means, means pivotally mounting one end of said vacuum box on one block and pivotally and slidably mounting the other end of said vacuum box on the other block, means for moving said vacuum box on said guide means back and forth between a first position for picking up the leading edge of a bias-cut length of stock and a second position at the far side of said feed conveyor, and stops engageable with said blocks for aligning said vacuum box with the bias cutting knife at said first position and with the path of travel of said feed conveyor at said second position.

6. Apparatus for cutting and transporting bias-cut lengths of ply stock to a butt splicer comprising a bias-cut conveyor for intermittently transporting a wide strip of ply material, bias cutting knife apparatus extending across said conveyor for cutting said lengths of ply stock from said strip, means mounting said knife apparatus at said conveyor for providing various bias angles of cut relative to the path of travel of said conveyor, a butt splicer feed conveyor for said bias-cut lengths of stock disposed at the delivery end of said bias-cut conveyor and having a path of travel at a fixed angle transversely thereof, an elongated vacuum box extending transversely of said bias-cut conveyor for picking up the leading edge of a bias-cut length of stock, guide means for said vacuum box extending along each side of said bias-cut conveyor and across said feed conveyor, a block slidable on each guide means, means pivotally mounting one end of said vacuum box on one block and pivotally and slidably mounting the other end of said vacuum box on the other block, a shoe slidable on each block, a pair of limit switches at opposite ends of each block actuated by relative motion of the shoe and block, means for moving said vacuum box along said guide means back and forth between a first position for picking up the leading edge of a bias-cut length of stock and a second position at the far side of said feed conveyor, and stops on said guide means for engaging said shoes to align said vacuum box with the bias cutting knife at said first position and with the path of travel of said feed conveyor at said second position.

7. Apparatus for transferring fabric pieces from a first location to a second location, the apparatus comprising means at said first location for supporting a fabric piece, means at said second location mounted in a fixed relation to said supporting means for receiving a fabric piece transferred thereto, a vacuum box disposed to extend transversely of a fabric piece in either location and having end portions engageable with opposing lateral margins of the fabric piece, a pair of parallel guide rails extending between said first and second locations, means mounted on said guide rails and both pivotally and slidably connected to said vacuum box for supporting said end portions of the vacuum box, a first pair of stops on said guide means which the ends of said vacuum box abut when the latter is in said first location, a second pair of stops on said guide means at said second location which the ends of said vacuum box abut when the latter is in said second location, the spacing along said guide means between one stop of said first pair and the corresponding stop of said second pair being greater than the spacing between the other stop of said first pair and the other corresponding stop of said second pair, and means for moving the vacuum box translationally relative to said rails back and forth between said locations, said latter means including means for separately moving one end of the vacuum box to its position abutting its respective stop at either location after the other end of the box has engaged its respective stop.

8. Apparatus for transferring a fabric piece from a first location into a position at a second location in which the fabric piece is displaced angularly in the plane of the fabric relative to its initial position, said apparatus comprising fabric pick-up means which includes laterally spaced end portions for engaging laterally spaced regions of said fabric piece, means supporting said pick-up means for reciprocation between said locations to effect transfer of said piece, and means providing for differential translational movement of one end portion of said pick-up means relative to the other end portion thereof between the terminal positions of the respective end portions of said pick-up means at each of said locations to effect an angular displacement of the position of said fabric piece.

9. Apparatus according to claim 8 wherein said pick-up means is a vacuum box.

10. Apparatus according to claim 8 wherein said supporting means for said pick-up means includes guide means extending from one said location to the other, and wherein said means providing for said differential movement of the end portion of said pick-up means includes blocks movable along said guide means, said blocks being slidably and pivotally connected to said pick-up means.

11. Apparatus according to claim 10 wherein said means providing for differential translational movement of said end portions of said pick-up means further includes a first pair of stops which the ends of said pick-up means abut when the latter is in said first location, and a second pair of stops which the ends of said pick-up means abut when the latter is in said second location, the spacing along said guide means between one stop of said first pair and the corresponding stop of said second pair being greater than the spacing between the other stop of said first pair and the other corresponding stop of said second pair.

12. Apparatus according to claim 11 wherein the position of said first pair of stops is adjustable to vary the difference in the spacing between corresponding stops of said first pair and said second pair.

13. Apparatus according to claim 12 and further including independent drive means engaged with said ends of the pick-up means for moving said pick-up means translationally back and forth between said locations, and means for stopping each drive means independently when the end of said pick-up means associated therewith engages its respective stop at each location.

14. Apparatus according to claim 9 which further comprises means for moving said vacuum box relative to said support means toward and away from said fabric at each said location.

References Cited in the file of this patent

UNITED STATES PATENTS

| | | |
|---|---|---|
| 1,575,892 | Ashby | Mar. 9, 1926 |
| 1,884,211 | Powell | Oct. 25, 1932 |
| 2,163,316 | Fisher | June 20, 1939 |
| 2,584,836 | Blumensaadt | Feb. 5, 1952 |
| 2,727,571 | Sayles | Dec. 20, 1955 |
| 2,733,766 | Wikle | Feb. 7, 1956 |
| 2,951,408 | Novick | Sept. 6, 1960 |
| 2,972,083 | Hasselquist | Nov. 29, 1960 |

FOREIGN PATENTS

| | | |
|---|---|---|
| 698,347 | Great Britain | Oct. 14, 1953 |